United States Patent [19]
Negishi

[11] Patent Number: 5,210,708
[45] Date of Patent: May 11, 1993

[54] COMPACT ELECTRONIC CALCULATOR EQUIPPED WITH GRAPHIC DISPLAY FUNCTION

[75] Inventor: Osamu Negishi, Akishima, Japan

[73] Assignee: Casio Computer Co., Ltd., Tokyo, Japan

[21] Appl. No.: 798,518

[22] Filed: Nov. 26, 1991

[30] Foreign Application Priority Data

Nov. 28, 1990 [JP] Japan .................... 2-326720

[51] Int. Cl.$^5$ .................... G06F 15/66; G06F 3/14
[52] U.S. Cl. .................... 364/710.14; 364/710.01; 395/140
[58] Field of Search .................... 364/710.14, 710.01; 395/140, 134

[56] References Cited
U.S. PATENT DOCUMENTS

| | | | |
|---|---|---|---|
| 4,535,416 | 8/1985 | Kano et al. | 364/710.01 |
| 4,794,553 | 12/1988 | Watanabe et al. | 364/710.01 |
| 4,794,554 | 12/1988 | Tamiya | 364/710.01 |
| 4,908,786 | 3/1990 | Kuno et al. | 395/140 X |
| 5,067,102 | 11/1991 | Eisenstein | 364/709.12 |

*Primary Examiner*—Tan V. Mai
*Attorney, Agent, or Firm*—Frishauf, Holtz, Goodman & Woodward

[57] ABSTRACT

A compact calculator includes a matrix type display unit and executes a graphic representation of a functional formula. When both the functional formula and an integral range are inputted as information about a definite integral, a judgement is done whether or not an X-value increased while forming a graphic representation is located with the integral range. If this X-value is present within the integral range, then the pixels from the coordinate point (X,Y) to an X-axis are turned on. Thus, the integral range is graphically represented under the above-described process operation.

5 Claims, 5 Drawing Sheets

COMPACT ELECTRONIC CALCULATOR EQUIPPED WITH GRAPHIC DISPLAY FUNCTION

BACKGROUND OF THE INVENTION

1. Field of the Invention

The present invention generally relates to a calculator equipped with a graphic representation function. More specifically, the present invention is directed to a compact electronic calculator capable of displaying graphic results obtained by calculating an integral, e.g., a definite integral.

2. Related Art of the Invention

In the conventional compact electronic calculator equipped with an integral calculating function, only calculations of integrals are available. The integral calculation is performed by entering a functional formula for the integral calculation in a functional region thereof, and the result of this integral calculation is displayed as a numeral value.

Accordingly, there is such a drawback of the above-described conventional calculator that no visual recognition can be done in what variation of the function the integral is calculated, or which range the integral is defined unless the calculation results are graphically represented.

On the other hand, another compact electronic calculator is commercially available, which graphically represents inputted formulae with employment of a dotmatrix type display panel. However, this conventional electronic calculator can graphically represent functions, but cannot display an integral range of a definite integral.

SUMMARY OF THE INVENTION

It is therefore an object of the present invention to provide an electronic calculator capable of graphically displaying a function to be integral-calculated, while a definite integral is calculated, and also capable of clearly representing an integral range.

A compact calculator, according to the present invention, comprises:

display means, having a dot-matrix type display panel, for graphically displaying functional formula;

display range data storage means for storing values of "$X_{min}$", "$X_{max}$", "$Y_{min}$" and "$Y_{max}$" corresponding to a representation range of a graph displayed on said display means;

input means for inputting a functional formula and an integral image corresponding to a definite integral;

formula storage means for storing the functional formula entered by the input means;

integral range storage means for storing the integral range inputted by the input means;

$\Delta X$-determining means for determining a variation amount $\Delta X$ corresponding to 1 dot of said display panel along an X-direction based upon the values of "$X_{min}$" and "$X_{max}$" stored in the display range data storage means;

X-value storage means for storing an X-value given to the functional formula stored in the formula storage means;

adding means for adding said X-value with a $\Delta X$-value and for inputting an addition result between them into the X-value storage means, said adding operation being executed while the X-value exist between "$X_{min}$" and "$X_{max}$";

Y-value calculating means for substituting the X-value to the functional formula and for calculating a Y value, every time the X-value stored in said X-value storage means is added by $\Delta X$ value;

designating means for designating a dot on the display panel corresponding to said X-value and Y-value in order to turn on the dot;

judging means for judging whether or not said X-value is located within the integral range stored in said integral range storage means; and, drawing means for turning on the dots of the display panel between the dot designated by the designating means and the X-axis in case that said judging means judges that the X-value is present within the integral range.

DETAILED DESCRIPTION OF THE INVENTION

Circuit Arrangement of Calculation

Figure 1:
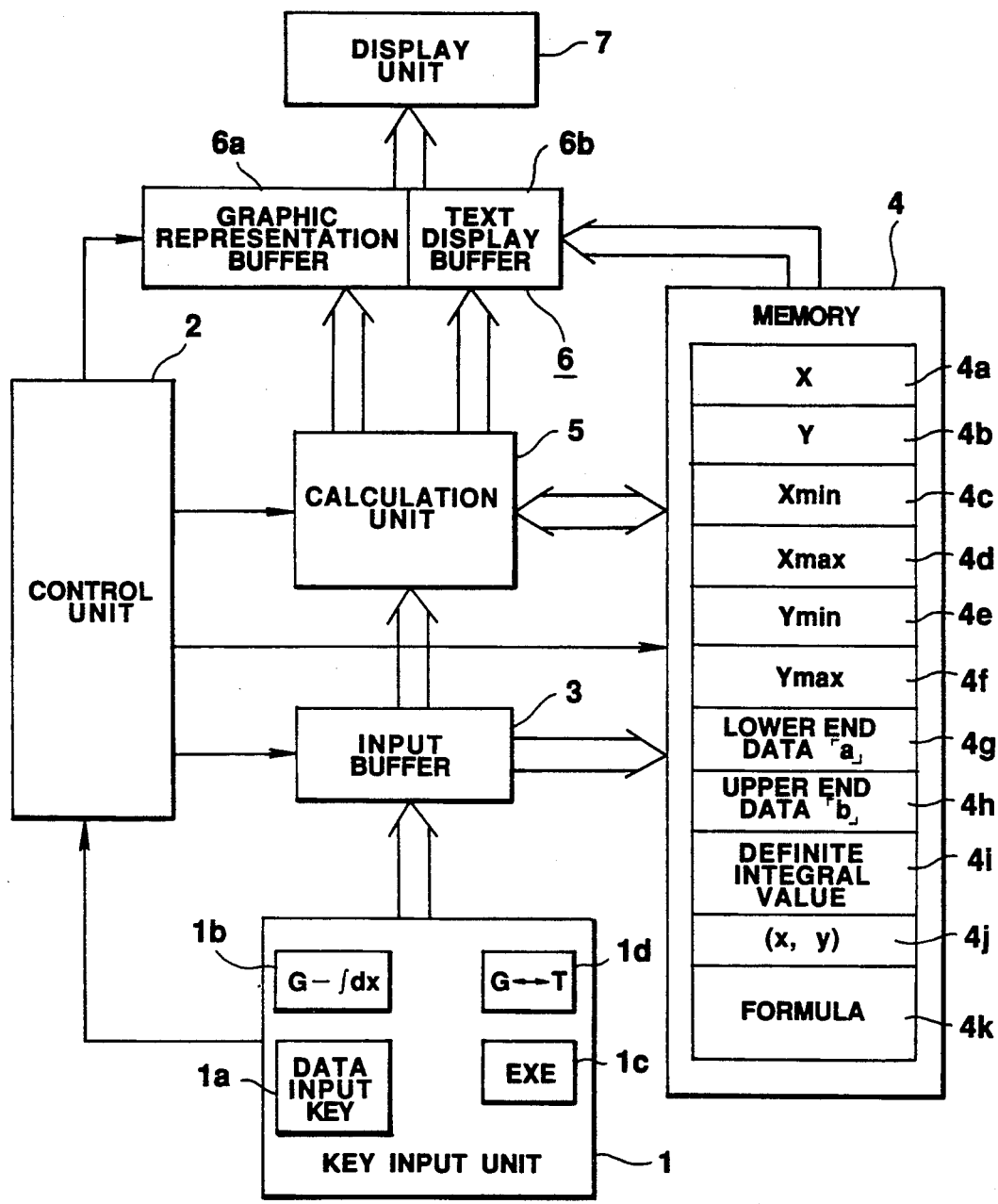
FIG. 1 is a schematic block diagram for showing an entire arrangement of a calculator according to a preferred embodiment of the present invention.

FIG. 1 shows a circuit arrangement of an electronic compact calculator according to a preferred embodiment of the present invention. In FIG. 1, reference numeral 1 indicates a key input unit. The key input unit 1 is equipped with a data entry key 1a containing a numeral entry key, a calculation key and the like; a graph/integral key "G-$\int dx$" 1b for inputting functional formula covering an integral and for transferring this functional formula to a mode for graphic representation; and, a graph/test key "G $\leftarrow 1dT$" for charging a graph indicative of an integral region and an integral formula in an alternate mode for display purposes.

A control unit 2 is employed in the calculator shown in FIG. 1, so as to control operations of various circuits provided within this calculator. Furthermore, an input buffer 3 is employed to temporarily store numeral values and formulae and the like which have been entered via the key input unit 1, and also to transfer them as key input data to a memory 4 and a calculation unit 5 (will be discussed later).

The memory 4 is arranged by, for instance, a RAM (random access memory). This memory 4 is constructed of an X register 4a for storing a coordinate value (X); a Y register 4b for storing a coordinate value (Y); an $X_{min}$ register 4c, an $X_{max}$ register 4d, a $Y_{min}$ register 4e and a $Y_{max}$ register 4f for storing a display range of a graphic representation; "a" register 4g for storing a definate integral lower end data, "b" register 4h for storing a definite integral upper end data and a definite integral value register 4i for storing a result of a definite integral; an (x,y) register 4j for storing (x,y) indicative of a display dot position on a display screen; and a formula storage register 4k. The data stored in the respective registers are transferred in response to an instruction issued from the control unit 2, to calculation unit 5 and a display buffer 6.

The calculation unit 5 executes various sorts of calculating processes, and sends a calculation result to display buffer 6 and the memory 4. The display buffer 6 is constructed of a graphic display buffer 6a and a test display buffer 6b. The graphic display buffer 6a stores display data about a graphic representation, whereas the text display buffer 6b temporarily stores a functional formula, a definite integral range, or an integral value. Then, the data which has been stored in this display buffer 6, is displayed on a display unit 7 in accordance with an instruction issued from the control unit 2. The display unit 7 is constructed of, for instance, a liquid crystal display having a dot matrix of 64 dots (longitudinal direction) and 96 dots (lateral direction). That is, this display unit 7 is arranged by a definite integral value display sectoin 7a (see FIG. 2B) having a small dot matrix with 8 dots (Y-direction) and 96 dots (X-direction); and a graphic representation section 7b having a small dot matrix with 56 dots (Y-direction) and 96 dots (X-direction).

Integral Calculation

Figure 2A:
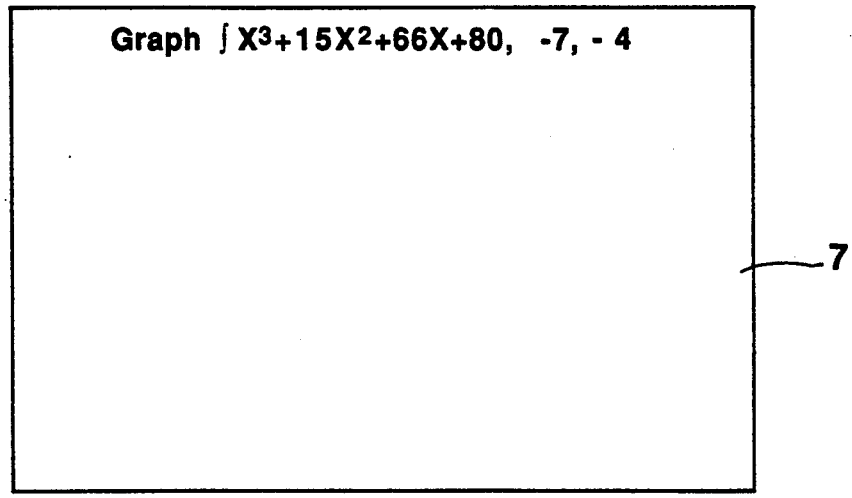
FIGS. 2 and 2B represent display conditions of the calculator shown in FIG. 1.
Figure 2B:
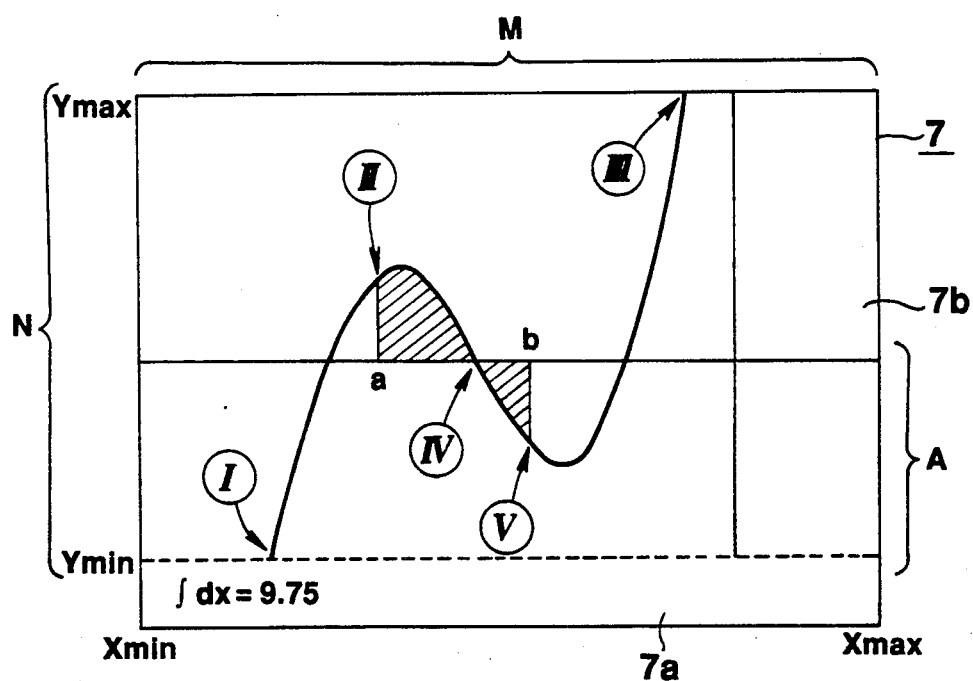
Figure 3:
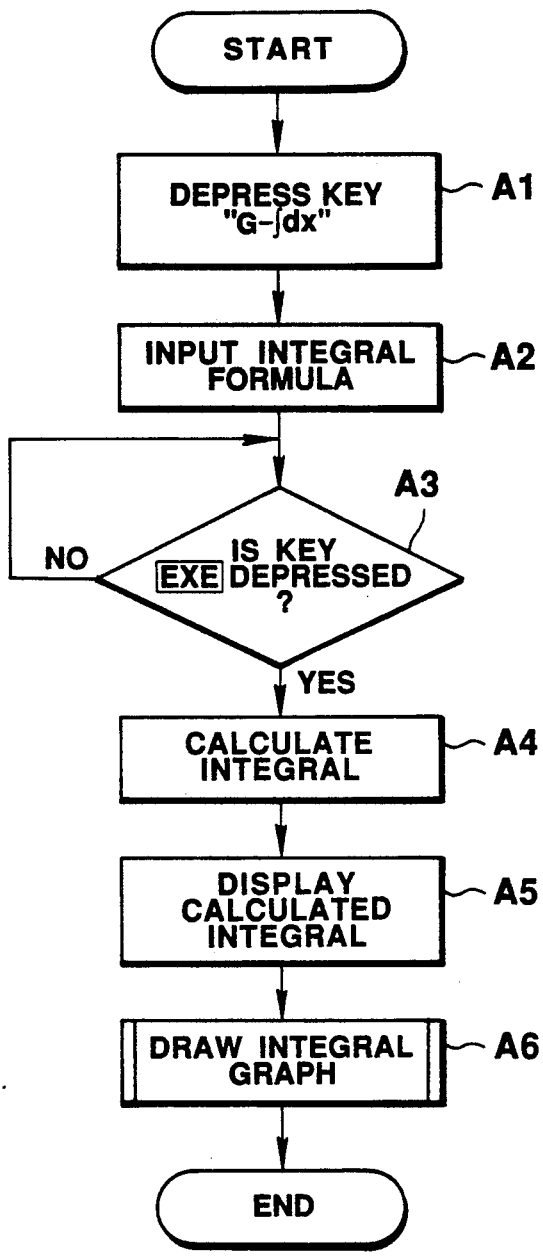
FIG. 3 is a flow chart for explaining a normal integral calculation.

Referring now to FIGS. 2 and 3, various integral calculations by the compact calculator according to the preferred embodiment of the present invention will be described.

As an initial operation, the compact calculator is set to an input mode of an integral formula by depressing the graph/integral key 1b mounted on the key input unit 1 (see a step Al of FIG. 3). Subsequently, as represented in FIG. 2A, an integral formula is entered with employment of the data input key 1a at a step A2.

It should be understood that an integral formula implies such a formula essentially consisting of a function $Y=f(x)$, lower end data "a" which defines an integral range while calculating a definite integral, and upper end data "b" for defining the same integral range. A "" code is inputted inbetween these items so as to segment this integral formula. In response to instructions from the control unit 2, the lower data is stored into the "a" register 4g of the memory 4, the upper data is stored into the "b" register 4h, and also the functional formula is stored into the formula register 4k.

After the integral formula has been entered, the calculator is brought into a waiting condition of an operation of the execution key 1c at a step A3. Then, when the key 1c ie operated, a definite calculation is executed in accordance with an integral format in the calculation unit 5 at a step A4. It is assumed in this preferred embodiment that an entered functional formula $Y=f(x)$ is given by:

$$f(x) = X^3 + 15X^2 + 66X + 80 \quad (1)$$

Also, another assumption is made of the lower end data "a" and the upper end data "b", by which the definite integral range of this functional formula (1) is defined, as follows:

$$\begin{cases} a = -7 \\ b = -4 \end{cases}$$

Thus, this definite integral is calculated as follows:

$$\int_a^b f(x)dx = \int_{-7}^{-4} (X^3 + 15X^2 + 66X + 80)dx \quad (2)$$

As a result, "9.75" is obtained as the value of the definite integral. Then, this value "9.75" is stored in the definite integral value register 4i of the memory 4, and as shown in FIG. 2A, is displayed on display section 7a for a definite integral value employed at the lower portion of the display unit 7 at a step A5. Also, in addition to this value of the definite integral, a graphic representation of the functional formula $Y=f(x)$ is made at graphic display section 7b provided at an upper portion of the display unit 7 together with an integral region defined by the functional formula at a step A6.

Integral Graphic Representation

With reference to a flow chart shown in FIG. 4, the above-explained graphic representing process will now be described more in detail.

The below-mentioned two formulae correspond to formulae for transforming a coordinate (X,Y) into values (x,y) of a display dot position on the graphic representation section 7b. That is, the first formula (3) indicates that a dot corresponding to the X value on the display screen of the display unit 7 is present at an x-th dot of the graphic representation section 7b from the leftmost dot. Also, the formula (4) represents that a dot corresponding to the Y value is present at a y-th dot of the graphic representation 7b from the lower end dot:

$$x = \frac{(X - X_{min})(M - 1)}{X_{max} - X_{min}} + 1 \quad (3)$$

(where $M = 96$)

$$y = \frac{(Y - Y_{min})(N - 1)}{Y_{max} - Y_{min}} \quad (4)$$

(where $N = 56$)

In the above-described formulae, symbol "M" denotes the number of dots employed in the graphic representation section 7b along the X-direction and corresponds to 96, whereas symbol "N" indicates the number of dots thereof along the Y-direction and corresponds to 56. It should be noted that since the values (x,y) of the display dot position are not always obtained as integer values, a process is needed for calculating these values (x,y) so as to transform integer values thereof.

Figure 4:
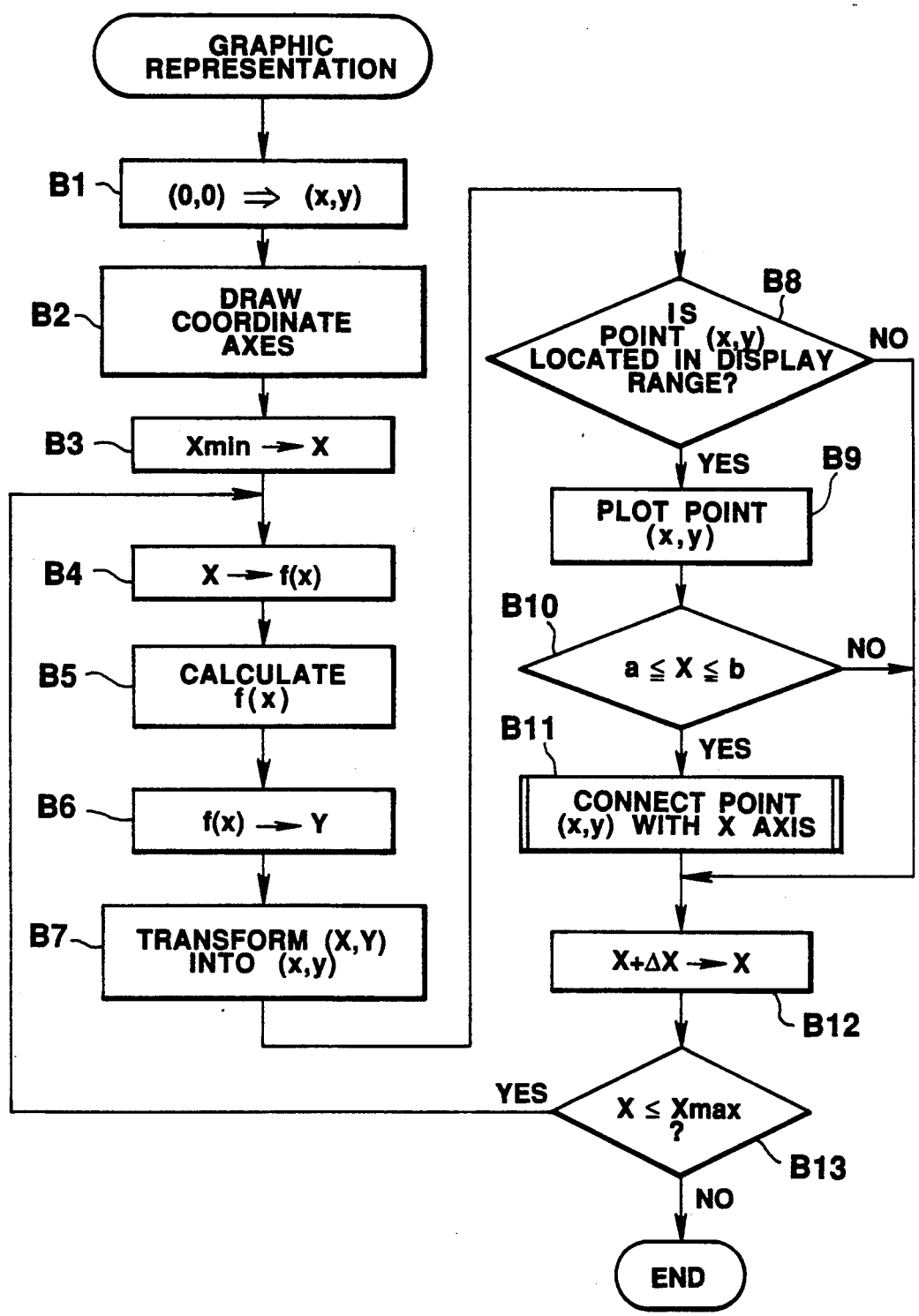
FIG. 4 is a flow chart for explaining a graphic representation operation.

At a first step B1 of FIG. 4, both position data of an X-coordinate axis and a Y-coordinate axis are calculated with employment of the above-described formulae (3) and (4), and then the axes are displayed. In accordance with this preferred embodiment, since $Y=0$, $Y_{min}=-18$, and $Y_{max}=22$, the X coordinate axis is obtained based upon the above-defined formula (4):

$$y = 25.75.$$

When this value is expressed by way of an integer, "y" is equal to 26 dots. In other words, based on this "y" value, when all dots which are 26-th dot from the lower end dot of the graphic display section 7b are displayed, this line corresponds to the x axis for the coordinate.

Subsequently, to obtain or calculate the Y axis, when "X" is calculated by substituting the formula (3) by $X=0$, $X_{min}=-12$, and $X_{max}=3$, a calculation result is obtained as follows:

X=77 dots.

Accordingly, when all dots which are 77-th dot from the left end of the graphic display section 7b are displayed in accordance with the value of this "x", this line corresponds to the desirable Y axis (see a step B2).

It is apparent from the foregoing description that these numeral values such as x=77 and y=26 may be varied, depending upon set values of the display range data.

After the process for representing both of the X coordinate axis and the Y coordinate axis has been completed, the process for graphically displaying the functional formula Y=f(x) will now be executed. At a first stage, the value of $X_{min}$ is stored into the X register 4a (step B3) so as to set the X value to the $X_{min}$. Then, this X-value is applied into the functional formula f(x) of the formula register 4k at a step B4, and thus, the value of this functional formula f(x) is calculated by the calculation unit 5 at a step B5. Then, the value of this functional formula f(x) is stored into the Y register 4b at a step B6.

As previously described, the coordinate values (X,Y) are obtained. Thereafter, these coordinate values are transformed into display positions (x,y) at the subsequent step B7. This transformation process is carried out in a similar manner to the previous transformation process for transforming the coordinate axis X and Y into the values (x,y) of display position, based upon the formulae (3) and (4). The calculation results of (x,y) are stored into the (x,y) register 4j. In this preferred embodiment, as shown in the formula (1), the functional formula f(x) is expressed by:

$$f(x) = X^3 + 15X^2 + 66X + 80 \quad (5)$$

Assuming now that the functional formula f(x) is substituted by X = −12($X_{min}$), the following calculation result is obtained:

$$f(x) = -280 \quad (6).$$

Then, if a dot position (x,y) corresponding to the coordinate value (x,y) = (−12, −280) is calculated based on the previous formulae (3) and (4), the dot position (x,y) is obtained as follows:

$$(x,y) = (1, -359).$$

In other words, this dot position (x,y) indicates such a dot position at a first dot from the left end dot of the graphic display section 7b along the X-axis direction, and also at a −359th dot from the lower end dot of this display section 7b along the Y-axis direction. At a next step B8, a judgement is made whether or not this dot position (x,y) is present within the display range.

If the dot position is located outside $1 \leq y \leq 56$, then the process operation is advanced from this step B8 to a step B12.

At this step B12, the value "X" is increased by ΔX. It should be noted that symbol "ΔX" indicates a variation amount of X having 1 dot along the X-axis direction, and a formula for calculating this variation amount is given by the following equation (7):

$$\Delta X = \frac{X_{max} - X_{min}}{M - 1} \quad (7)$$

(where $M = 96$)

In this case, since $X_{min} = -12$ and $X_{max} = 3$, this variation amount ΔX is given by:

$$\Delta X \approx 0.1579 \quad (8)$$

Accordingly, the value (X+ΔX) is newly set to "X", and then is stored with the X register 4a. Now, since X=$X_{min}$, namely X=−12, the value is increased by ΔX, resulting in a new X:

$$X = -11.8421 \quad (9)$$

At a subsequent step B13, a check is made whether or not the value X is smaller than $X_{max}$. As the value X is sufficiently smaller than $X_{max}(=3)$, this judgement result becomes YES and therefore the process operation is returned to the previous step B4.

Thus, the value X is sequentially incremented and the value Y corresponding to a predetermined X is calculated. When a judgement is established that the dot position (x,y) is located within the display range, the process operation is advanced to a step B9. At the step B9, the dot which is indicated as (x,y) in the plot process, is plotted, or lightened at a point ① as shown in FIG. 2B. Subsequently, the process operation is advanced to a step B10 at which a check is done whether or not the value X is located within the integral range. At this time, since the value X is present outside the range of a $\leq X \leq$ b, this judgement result becomes NO. Then, the process operation is advanced to a step B12 at which the value X is incremented, and thereafter the process operation is advanced via a step B13 to process operations after the step B4.

As previously explained, the dot plotting operation is successively carried out, so that a graph of the functional formula Y=f(x) is drawn on the graphic representation section 7b. Then, when the value X becomes x≧a (②point of FIG. 2B), the judgement result becomes "YES" at the step B10 and the process operation is advanced to a step B11. At this step B11, such a process operation is executed that the dot position (x,y) is connected to the X-axis at this stage, namely all of the dots existing between the dot position (x,y) and the X-axis are plotted, or lightened. This plotting operation to connect the dot point (x,y) and the X-axis will be discussed later more in detail.

Thereafter, the value X is incremented at a step B12, and then the process operation is returned to the previous step at which another dot position (x,y) corresponding to a new position (X,Y) is plotted. If this value "X" is located within the integral range, then this position (x,y) is connected with the X-axis. As previously stated, the above-described process operation is repeated within a range defined by a $\leq x \leq$ b, whereby all of the dots present within the integral range are plotted on the display screen. Note that this representation is made by a hatching line. When the value X exceeds one integral range of "b", the process operation jumps over the step 11, and therefore a graphic representation related to the functional formula Y=f(x) is drawn. Then, if the value X exceeds a certain value and the dot position (x,y) exceeds a point ③ shown in FIG. 2B, the judgement result at the step B8 becomes "NO" and thus the process operation also jumps over the step B9. Thereafter although the value X is successively incremented, no such dot display process is carried out. If the value X exceeds the maximum value $X_{max}$, then the judgement result becomes NO at the step 13 and accordingly this process operation is ended.

Connection Between Dot Position with X-Axis

The process for connecting the dot position (x,y) with the X-axis will now be explained more in detail.

As to this connecting process, differences may exist in the connecting process, depending upon three conditions. First, the dot position (x,y) is present in a positive region (y>0). Secondly, the dot position (x,y) is located within a negative region (Y<0). Thirdly, the dot position (x,y) is overlapped with the X-axis (Y=0).

Figure 5:
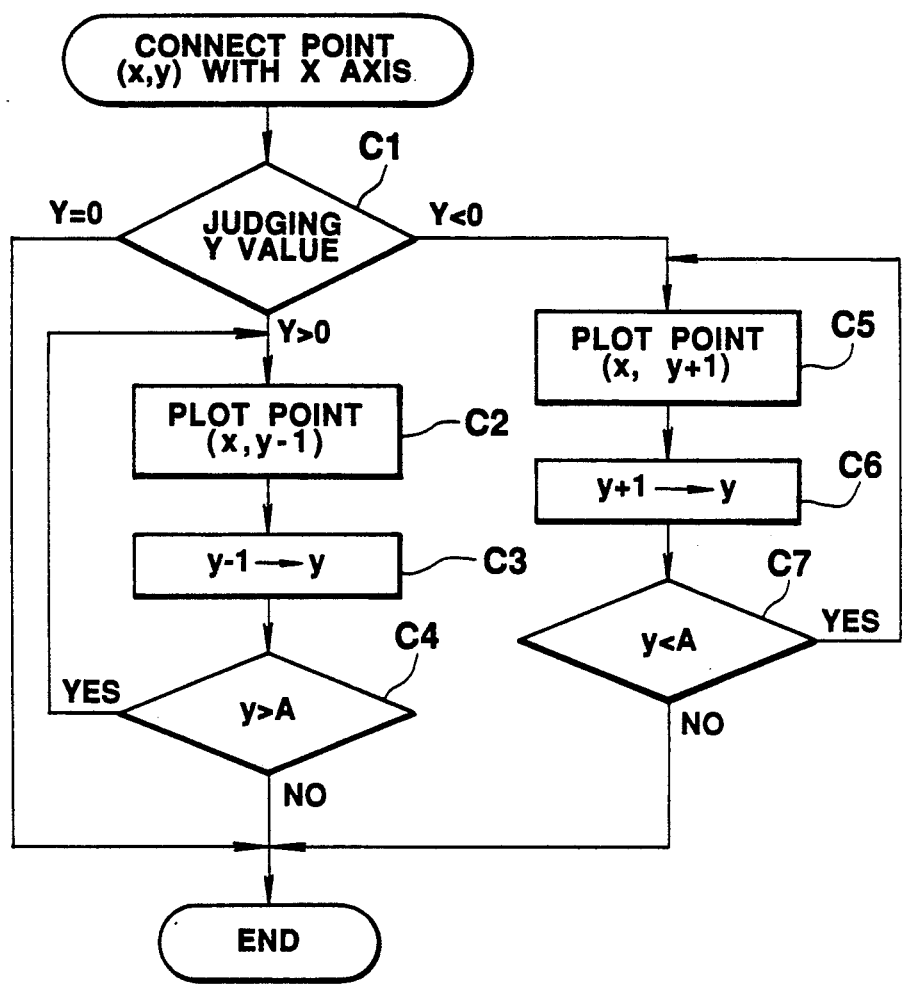
FIG. 5 is a flow chart for explaining a lighting operation for an integral region.

At a first step Cl of a flow chart as shown in FIG. 5, a judgement is done which condition, the dot position (x,y) belongs to. First, a description will now be made of such a case that the dot position (x,y) is present in the positive range (Y>0). Considering the dot point (x,y) at the point (II) of FIG. 2B, if the judgement result is made by Y>0 at the step C1, the process operation is advanced to a further step C2, at which a dot position (x, y−1) just under this dot point (x,y) on the functional formula y=f(x) is lightened. Then, in order to plot another dot just under the above dot position (x, y−1), the value "y" is decremented by 1 at a step C3, and the corresponding dots are successively plotted in this operation. This process operation is repeatedly performed under such condition that a judgement result of the step C4 satisfies y>A (A=26). In this case, symbol "A" indicates the number of dots from the lower end of the graph display section 7b to the X-axis. Then, when Y=A, the judgement result becomes "NO" and therefore the process operation is completed.

As previously explained the graphic representation of Y=f(x) is performed from the point (II) to a point (IV) shown in FIG. 2B in the region defined by Y>0, while the value X is incremented, and also the above-described process operation is carried out. However, in case that the X-axis is overlapped with the dot position (x,y), since this implies a cross point between the X-axis and the graph line, and also this dot point has been lightened, no further process operation is carried out at the point (IV).

Next, a description is made of such a case that the dot position (x,y) is located within the negative region, i.e., Y <0. Consider now the point (V) shown in FIG. 2B. Assuming that this dot position is also equal to (x,y), another dot position (x, y+1) just above the dot position (x,y) is lightened at a step C5. Thereafter, in order to turn ON another dot positioned just above this dot position (x, y+1), the value "Y" is incremented by only 1 at a step C6, during which the corresponding dots are successively plotted. This plotting process operation is repeated as long as the condition of y<A (A=26) is satisfied which is judged at the step C6. Then, if y=A, then the judgement result becomes "NO" and therefore this plotting operation is completed. This process is carried out from a point exceeding the point (IV) to the point (V) in combination with the graphic representation of the functional formula Y=f(x).

In accordance with the above-explained three conditions, the straight-shaped dots sandwiched by the graphic representation of the functional formula Y=f(x) and the X-axis, are plotted, or lightened within the definite integral range of $a \leq x \leq b$.

After such a functional formula of Y=f(x) has been graphically drawn, when the graph/test key 1d equipped with the key input unit 1 is operated, as shown in FIG. 2A, the display condition is changed from such a graphic representation into a representation of an integral formula, so that confirmation can be done as to the functional formula, or the functional formula can be reentered.

It should be noted that although the plotting operation of the dots within the integral range has been performed in combination with the graphic representation of Y=f(x) in the above-described preferred embodiment, another method may be alternatively carried out. For instance, after a graphic representation, a definite integral range may be displayed.

What is claimed is:

1. A compact calculator comprising:
    display means, having a dot-matrix type display panel, for graphically displaying a functional formula;
    display range data storage means for storing values of "$X_{min}$", "$X_{max}$", "$Y_{min}$" and "$Y_{max}$" corresponding to a representation range of a graph displayed on said display means;
    input means for inputting a functional formula and an integral range corresponding to a definite integral;
    formula storage means for storing the functional formula entered by the input means;
    integral range storage means for storing the integral range inputted by the input means;
    ΔX-determining means for determining a variation value ΔX corresponding to 1 dot of said display panel along an X-direction based upon the values of "$X_{min}$" and "$X_{max}$" stored in the display range data storage means;
    X-value storage means for storing an X-value given to the functional formula stored in the formula storage means;
    adding means for adding said X-value with said value ΔX to produce an addition result and for inputting said addition result into the X-value storage means, said adding operation being executed while the X-value is between "$X_{min}$" and "$X_{max}$";
    Y-value calculating means for substituting the X-value into the functional formula and for calculating a Y-value, every time the X-value stored in said X-value storage means is added by the value ΔX;
    designating means for designating a dot on the display panel corresponding to said X-value and Y-value in order to turn on the dot;
    judging means for judging whether or not said X-value is located within the integral range stored in said integral range storage means when said designating means designates a dot on the display panel; and
    drawing means for turning on the dots of the display panel between the dot designated by the designating means and the X-axis when said judging means judges that the X-value is present within the integral range.

2. A compact calculator as claimed in claim 1, further comprising:
    calculating means for calculating a definite integral with respect to the inputted functional formula under an integral range; and,
    mean for displaying a result of the definite integral calculation calculated by said calculation means.

3. A compact calculator as claimed in claim 1, further comprising:

means for changing a display condition between a display of information about the inputted definite integral and a graphic representation of the function which has been calculated in the integral mode on a display panel.

4. A graph forming apparatus comprising:

display means having a dot matrix type display panel, said display means having an X-Y coordinate on said display panel;

display range data storage means for storing values of "$X_{min}$", "$X_{max}$" and "$Y_{max}$" corresponding to a representation range of a graph display don said display means;

means for storing boundary data including two values of X1 and X2 so as to specify a range in an X-direction;

graph forming means for forming a graph representative of a formula "$y = f(x)$" on said display panel, said graph forming means including means for increasing the value of said "x" in said formula at a predetermined pitch from the value "$X_{min}$" to the value "$X_{max}$", means for calculating the value of said $f(x)$ in said formula every time said "x" is increased by the predetermined pitch to produce a calculation result, and plotting means for plotting points which constitute the graph on the display panel based upon the calculation result;

judging means for judging whether or not the point plotted by said plotting means is located within the specific range indicated by said boundary data; and control means for turning on the dots between the point plotted by said plotting means and an X-axis, when said judging means determines that the plotted point is located within the specific range.

5. A graph forming apparatus as claimed in claim 4, wherein said values of $X_1$ and $X_2$ stored in said boundary data storage means correspond to an upper limit value and a lower limit value of the definite integral; said graph forming means graphically displays an integral function as $f(x)$; and said control means turns on display pixels indicative of the integral range.

* * * * *